United States Patent
Wiedenhaft et al.

(10) Patent No.: US 6,662,749 B1
(45) Date of Patent: Dec. 16, 2003

(54) CLUMPING CELLULOSIC ANIMAL LITTER

(75) Inventors: Robert V. Wiedenhaft, Green Bay, WI (US); Rick L. Yoder, Green Bay, WI (US)

(73) Assignee: Kadant Fibergen, Inc., Acton, MA (US)

( * ) Notice: Subject to any disclaimer, the term of this patent is extended or adjusted under 35 U.S.C. 154(b) by 0 days.

(21) Appl. No.: 09/962,515

(22) Filed: Sep. 25, 2001

(51) Int. Cl.$^7$ ................................................ A01K 1/015
(52) U.S. Cl. ..................................................... 119/172
(58) Field of Search ................... 119/171, 172, 119/173

(56) References Cited

U.S. PATENT DOCUMENTS

| | | |
|---|---|---|
| 4,405,354 A | 9/1983 | Thomas |
| 4,532,890 A | 8/1985 | Ohki |
| 4,560,527 A | 12/1985 | Harke |
| 4,676,196 A | 6/1987 | Lojek |
| 4,727,824 A | 3/1988 | Ducharme |
| 4,812,428 A | 3/1989 | Kohut |
| 4,844,010 A | 7/1989 | Ducharme |
| 4,881,490 A | 11/1989 | Ducharme |
| 4,883,021 A | 11/1989 | Ducharme |
| 4,949,672 A | 8/1990 | Ratcliff |
| 5,014,650 A | 5/1991 | Sowle |
| 5,016,568 A | 5/1991 | Stanislowski |
| 5,018,482 A | 5/1991 | Stanislowski |
| 5,094,190 A | 3/1992 | Ratcliff |
| 5,100,600 A | 3/1992 | Keller |
| 5,101,771 A | 4/1992 | Goss |
| 5,135,743 A | 8/1992 | Stanislowski |
| 5,176,108 A | 1/1993 | Jenkins |
| 5,183,655 A | 2/1993 | Stanislowski |
| 5,188,064 A | 2/1993 | House |
| 5,189,987 A | 3/1993 | Stanislowski |
| 5,193,489 A | 3/1993 | Hardin |
| 5,207,830 A | 5/1993 | Cowan |
| 5,329,880 A | 7/1994 | Pattengill |
| 5,339,769 A | 8/1994 | Toth |
| 5,359,961 A | 11/1994 | Goss |
| 5,452,684 A | 9/1995 | Elazier-Davis |
| 5,458,091 A | 10/1995 | Pattengill |
| 5,577,463 A | 11/1996 | Elazier-Davis |
| 5,762,023 A | 6/1998 | Carter |
| 5,826,543 A * | 10/1998 | Raymond et al. ........... 119/173 |
| 5,901,661 A | 5/1999 | Pattengill |
| 5,970,916 A | 10/1999 | Yoder |
| 6,089,189 A * | 7/2000 | Goss et al. .................. 119/173 |
| 6,294,118 B1 * | 9/2001 | Huber et al. ................ 119/173 |

* cited by examiner

*Primary Examiner*—Yvonne Abbott
(74) *Attorney, Agent, or Firm*—Michael Best & Friedrich LLC

(57) ABSTRACT

Clumping cellulosic animal litter comprising a cellulosic substrate coated with a first coating of a dual adhesive and surface active agent, and a second coating of guar gum, and the method of making such particles.

21 Claims, 1 Drawing Sheet

CLUMP STRENGTH

| | 15 Min | 1 Hour | 4 Hours | 24 Hours |
|---|---|---|---|---|
| ■ clay | 0.391 | 0.447 | 0.967 | 2.18 |
| ■ clay | 0.567 | 0.954 | 1.357 | 3.85 |
| □ cellulose | 0.43 | 0.52 | 0.89 | 4 |
| □ invention | 2.293 | 2.988 | 3.379 | 10 |

# CLUMPING CELLULOSIC ANIMAL LITTER

BACKGROUND OF THE INVENTION

This invention relates generally to cellulosic animal litters and, more particularly, to clumping cellulosic animal litters made from specially treated agglomerated cellulosic particles.

Small domesticated animals, such as cats, are often trained to urinate and defecate in special containers commonly referred to as litter boxes. Untrained caged animals, such as guinea pigs, hamsters, gerbils, dogs, birds, monkeys, ferrets and laboratory mice and rats urinate and defecate on the floors of their cages. Therefore, pet owners, veterinarians and laboratory personnel line the bottoms of litter boxes and cages with absorbent material to collect the animals' urine and feces. In order to control objectionable odors from the contaminated absorbent material, it is necessary to periodically remove and dispose of that material and to replace it with fresh absorbent material.

Until recently, it was found to be necessary to completely remove contaminated absorbent material from the litter boxes and cages in order to control objectionable odors. However, now, clay-based absorbent materials have been developed which, when wetted with animal urine, form coherent clumps that may be easily segregated and removed from the remaining uncontaminated absorbent material. These clay-based absorbents, which are generally referred to as "clumping litters", are more efficient and convenient to use than prior absorbent materials. As a result, they have gained widespread commercial acceptance.

Unfortunately, clay-based absorbents have some drawbacks. First, they are dusty. Second, clump formation in clay-based clumping litters is often not as rapid as would be desired. Also, the clumps are often soft and friable, which can complicate the removal of the wetted clumps. Additionally, clay-based clumping litters are relatively expensive since they require that the clay be mined, processed, and often shipped long distances. The mining process is not only expensive, it can scar the landscape and is therefore environmentally undesirable. Also, different types of clay must be combined and treated in certain ways in order to achieve the desired clumping effect.

Substrates containing at least 10% by weight cellulosic content are a known alternative to straight clay-based absorbents for use in absorbing and disposing of animal urine and feces. When such cellulosic materials are made from waste produced in paper manufacture, they offer significant advantages over clay-based absorbents. First, the starting material is very inexpensive. Second, it is plentifully available and, once used and disposed of, the cellulosic component readily degrades, reducing the disposal problems inherent in the use of clay-based absorbents. Some particularly desirable methods of making cellulosic granules from paper waste are described in U.S. Pat. Nos. 4,560,527, 4,619,862, 4,621,011, and 4,721,059, the disclosures of which are incorporated herein by reference.

Although untreated cellulosic granules may form friable clumps, until the advent of the present invention, the only practical method for making reliable and efficient clumping cellulosic absorbents is described in U.S. Pat. No. 5,970,916 to the present inventors. This patent describes a cellulosic animal litter in which the cellulosic particles which make up the litter are coated first with xanthan gum and then with guar gum. Although the clumping cellulosic litter of the '916 patent works well, it is desirable to improve the performance and reduce the costs of making a clumping cellulosic litter.

Since the development of the invention described in U.S. Pat. No. 5,970,916, the present inventors have come to recognize that it is essential to form clumps of urine-soaked litter immediately as the litter is wetted. Otherwise, since cats instinctively scratch and dig into the litter to cover their wastes, they often spread the litter before it is able to form clumps, thereby reducing the overall efficiency and convenience of using clumping litter.

This problem is addressed in the present invention in which near instantaneous clumping is achieved. The present invention thus constitutes an important contribution to the animal litter art.

SUMMARY OF THE INVENTION

The present invention represents a substantial advance in clumping cellulosic absorbents by providing coated cellulosic particles having a first or inner coating of a dual adhesive and surface active agent and a second or outer coating of guar gum. The dual adhesive and surface active agent must be: 1) water soluble, 2) capable of penetrating and drying into the particulate cellulosic absorbents, 3) capable of adhering to guar, and 4) capable of being readily re-solubilized when the granule is wetted with urine. Also, a mixture of coated and uncoated particulate cellulosic absorbents may be used.

Certain polyacrylates have been identified which satisfy the above requirements, as will described below. Since the properties of polyacrylates in respect of these properties is not strictly predictable, it is expected that other polyacrylates as well as acrylate copolymers (e.g., methyl methacrylate) could also be used. Such acrylates and polyacrylates will have to be identified by routine testing against the above criteria, performed by those of ordinary skill in the polymer art.

The polyacrylates already known to perform as a dual adhesive and surface active agent in the practice of this invention will have an average molecular weight of about 1000 to 5000, with an average molecular weight of about 2000 to 4000 being preferred, and an average molecular weight of about 2000 to 3000 being presently most preferred. A specific polyacrylate that has been found to be particularly useful as a dual adhesive and surface active agent is sold under the designation Spinks 211 by H.C. Spinks Clay Company, Inc., of Paris, Tenn. Spinks 211 is an aqueous sodium polyacrylate solution. It is a clear, amber fluid, with a solids content (% by weight, dry 0.6 gram at 150° C. for 60 minutes in a forced draft oven) of 43.0–45.0, a pH (ASTM E-70) of 7.00–8.00, and a viscosity (as shipped, cps Brookfield LV spindle #2, 30 rpm, 25° C.) of 100–500. Spinks 211 has an average molecular weight of about 2000–3000.

The amount of dual adhesive and surface active agent used will be at least an amount sufficient to coat 50% of the surface of the granules and no more than the amount capable of being absorbed by the granule. Preferably, the dual adhesive and surface active agent will be present in an amount that primarily coats and only minimally penetrates into the granules. The actual solids level will be limited by viscosity—a solids level that would interfere with efficient handling of the material should be avoided. Otherwise, the solids level should be chosen to supply a sufficient amount of the dual adhesive and surface active agent to bind the guar coating.

In a preferred embodiment where the 2000–3000 molecular weight polyacrylate (e.g., Spinks 211) is used in an aqueous solution, the dual adhesive and surface active agent will be used at a concentration level of about 43%–45% by weight solids, assuming that the guar is present in the preferred range set out below. From about 1% to 5% by weight of this solution should be used, based on the weight of the granules.

The level of guar used in coating these granules will be at least about 1% to 7% based on the weight of the granules previously coated with the dual adhesive and surface active agent. Preferably, the guar will be used at a level of about 2% to 4% percent by weight. Furthermore, it is not necessary to coat all of the cellulosic particles in order to achieve the near instantaneous clumping made possible by the present invention. Indeed, while it is preferred that up to 100% of the granules are coated as little as 25% by weight of the granules may be coated and preferably at least about 50% to 75% by weight of the granules will be coated to achieve the desired clumping speed and hardness.

This improved cellulosic absorbent may also include anti-microbial agents, fragrances and coloring agents. In the discussion above and that which follows, substrates containing at least 10% by weight cellulosic content are referred to as "cellulosic particles". However, it is preferred that the cellulosic particles used in the practice of this invention contain at least 40% by weight cellulosic content and most preferably at least 50% by weight cellulosic content.

The present invention also entails unique processes for making and using the above cellulosic particles.

DETAILED DESCRIPTION OF THE PREFERRED EMBODIMENTS

Figure 1:
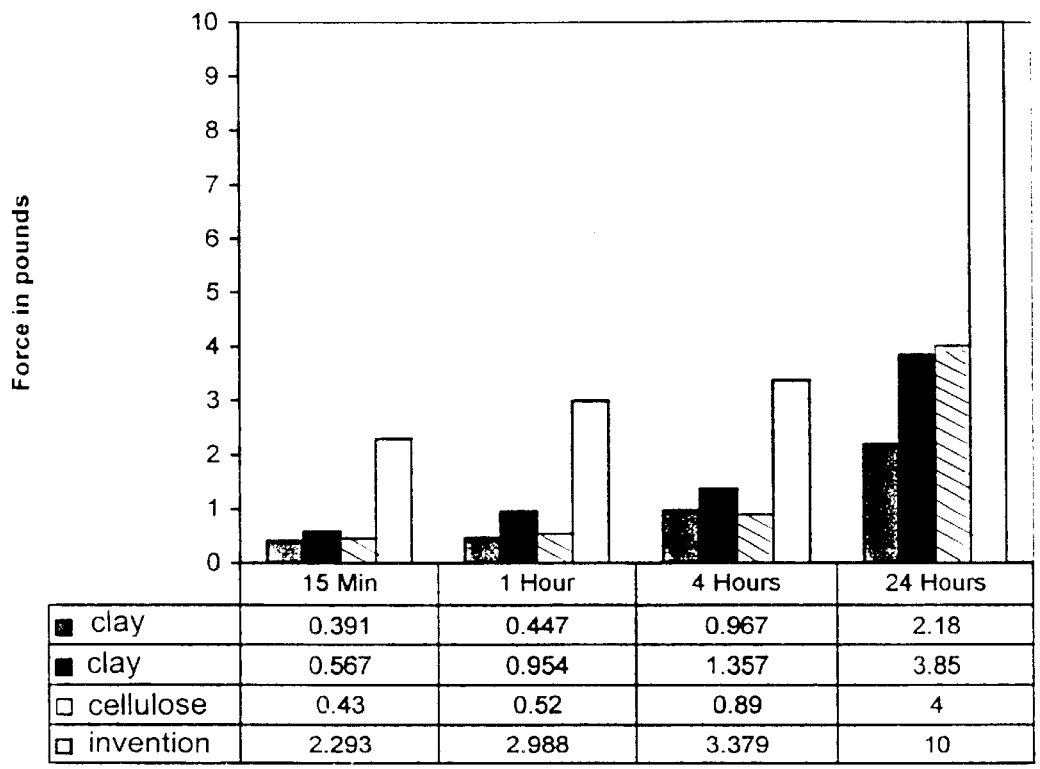
FIG. 1 is a bar graph demonstrating the superiority of the present invention over prior art clumping animal litters, as detailed in Example 2.

The present invention comprises a particulate cellulosic substrate coated with a first or inner coating of dual adhesive and surface active agent and a second or outer coating of guar gum or guar gum derivatives which is in turn adhered to the previously coated particles.

As explained below, the cellulosic particles may be in pellet or granular form, although the granular form is preferred, particularly when the litter is to be used with cats. Additionally, the particles may be treated with other adjuncts including anti-microbial agents, fragrances, coloring agents (pigments or dyes), etc., as desired. Preferably, the adjuncts will be applied before the dual adhesive and surface active agent and guar gum (or guar gum derivative). In an alternative preferred embodiment, at least the fragrances will be applied, in an aqueous solution or suspension form, prior to the application of the guar gum coating.

The Particulate Cellulosic Substrate

The particulate cellulosic substrate may be prepared from plant fiber such as fiber from trees and plants, sugar beets, sugar cane, citrus pulp, potatoes, grains, peanut hulls, corn cob, tobacco stems, apple pumice, natural grasses, cotton, peat, etc. Preferably, it will be derived from wood pulp, citrus pulp, sugar cane, primary paper sludge, or a combination of primary and secondary paper sludge. In all cases, the particles should be no greater than about 4 mesh and preferably will be in the range of about 4 to 60 mesh. Particles in the range of about 12–20 mesh are particularly preferred when the absorbents are to be used with small animals such as cats, since particles in this size range reduce tracking from the litter box. The lengths of the cellulose fibers preferably will be less than about 10 mm, more preferably will be less than about 1 mm and most preferably will be less than about 0.3 mm.

Although the particles may be in granular, pellet or other forms, agglomerated granules are particularly preferred. Desirable methods of forming or agglomerating cellulosic granules are described in U.S. Pat. Nos. 5,560,527, 4,619,862, 4,621,011, 4,721,059, and 5,019,564 which are incorporated herein by reference. A particularly suitable agglomerated cellulosic granule made from primary and secondary sludge generated in the manufacture of virgin and recycled paper is available from GranTek, Inc. of Granger, Ind. under the trademark BIODAC®. BIODAC® granules comprise a cellulose complex consisting of about 47–53% by weight paper fiber, about 28–34% by weight of kaolin clay and about 14–20% by weight calcium carbonate, as well as minor amounts (less than about 1%) of titanium dioxide. BIODAC® granules are available in a variety of different mesh size ranges including 4/20, 8/30, 12/20, 16/30, and 20/50. Typical properties of these products are as follows:

| BIODAC® GRANULES | BULK DENSITY | MOISTURE CONTENT | pH | LIQUID HOLDING CAPACITY | SCREEN ANALYSIS |
|---|---|---|---|---|---|
| 4/20 | 41.0 ±3.0 lbs/cft | Less than 5% | 7.0–8.0% | 16–20% | +4 mesh < 5.0% 4–20 mesh < 90% −30 mesh < 1.0% |
| 8/30 | 41.0 ±3.0 lbs/cft | Less than 5% | 7.0–8.0% | 16–20% | +6 mesh < 1.0% 8–30 mesh < 90% −40 mesh < 1.0% |
| 12/20 | 42.0 ±3.0 lbs/cft | Less than 5% | 7.0–8.0% | 16–20% | +10 mesh < 1.0% 12–20 mesh 80% −40 mesh < 1.0% |
| 16/30 | 43.0 ±3.0 lbs/cft | Less than 5% | 7.0–8.0% | 16–20% | +14 mesh < 1.0% 16–30 mesh 90% −40 mesh < 1.0% |
| 20/50 | 45.0 ±3.0 lbs/cft | Less than 5% | 7.0–8.0% | 16–20% | +16 mesh < 1.0% 20–50 mesh 90% −60 mesh <1.0% |

The Clumping Treatment

Proper application of the clumping treatment to the cellulosic particles which make up the litter substrate is critical. The cellulosic particles will include aqueous adjuncts such as antimicrobial agents, fragrances and coloring agents. They are then coated with the dual adhesive and surface active agent. This may be done, for example, using a drum coating device, such as a cement mixer or a horizontal coating drum, an auger mixer, a fluid bed mixer, a spray tower, a vibrating bed mixer, or other similar device known to those skilled in the coating arts. The use of an auger mixer is presently preferred. Also, both batch and continuous feed systems may be used. Continuous systems are currently preferred.

Dry guar gum particles are then dusted onto the tacky surfaces of the previously coated particles. The guar gum is preferably in the form of a powder of less than about 80 mesh and preferably less than about 200 mesh. The level of guar gum pick-up on the coated particles should be in the range of about 0.5% to 5.0% by weight and preferably about 3% by weight based on the weight of the previously coated particles. Guar gum derivatives, including but not limited to hydroxypropyl guar, carboxymethyl guar and carboxymethyl hydroxypropyl guar, may be used in lieu of guar gum.

Finally, an aqueous coating may be applied at this point in the form of a solution of one or more of an enhancing agent comprising aqueous solutions of natural water-soluble polymers with adhesive properties such as CMC, methylcellulose, tapioca starch, xanthan gum, guar gum, guar gum derivatives and karaya gum. Among these materials, CMC is preferred. The amount of the an enhancing agent, based on solids, may range from about 0.001% to 0.2% by weight of the granules and preferably will range from about 0.01% to 0.1% by weight. The level of the an enhancing agent in the water will depend on the viscosity of solutions of those materials—the levels need to be kept low enough to insure workable or "sprayable" viscosities. For example, the following levels could be used: karaya gum solution 20 g/1000 ml); tapioca starch solution (10 g/1000 ml); xanthan gum solution (8 g/1000 ml); guar gum solution (5 g/1000 ml) and methylcellulose solution (10 g/1000 ml). This coating helps tack down any guar gum particles that failed to adhere. It also contributes to the overall performance of the final product.

The final particles preferably will have a moisture level of up to 10% by weight. Preferably, the moisture level will be about 5% to 6% and most preferably it will be no more than about 5% by weight. If the level of moisture in the particles exceeds these levels, it is preferred that the particles be dried to a moisture level at least as low as 8% by weight before packaging them for shipment and later use. Finally, whether or not drying is required, it is desirable to permit the guar gum-coated particles to "cure" for at least about 1 to 2 minutes before packaging to prevent the particles from sticking together.

Various adjunct materials may be added to the cellulosic granules. Some of these (such as a biocide) are required in many cases, whereas other adjuncts (such as a coloring agent) are optional. Preferably, the adjuncts are applied before the acrylate and guar gum coatings. For example, one or more of the adjuncts may be incorporated into the aqueous mist applied to the cellulosic particles before application of the dual adhesive and surface active agent.

Useful biocides can be chosen from, for example, the following list: quaternary ammonium salts, aldehyde derivatives, carbamates, azo chlorides and thiocyanates. Among these, quaternary ammonium salt (bidecyl dimethyl ammonium chloride), available as Bardac® 2250 from Lonza Company of Fairlawn, N.J. is preferred.

Various commercially available fragrances may be used. The presently preferred fragrance is Green Fresh®, which is available from Bush, Boake & Allen of Mountvale, N.J. This fragrance is described as a fruity floral blend of jasmine and rose accented by fruity and citrus top notes and underscored by a woody and musky base. In a preferred embodiment about 0.05% to 0.25% by weight and more preferably about 0.10% by weight of fragrance will be used.

The following examples are intended to illustrate the practice of the present invention. They are not intended to be exhaustive or limiting of the invention. Unless otherwise indicated, parts and percentages are by weight.

EXAMPLES

Example 1

Preparation of Clumping Cellulosic Litter

Cellulosic particles prepared in accordance with the teaching of U.S. Pat. Nos. 5,460,527, 4,621,011, and 4,721,059, were obtained from GranTek, Inc., Granger, Ind. The particles were in granular form and available, before treatment in accordance with the present invention, as BIODAC® granules having a mesh size of 12/20.

The BIODAC® particles were emptied into a cement mixer operating at about 25 rpm and passed beneath a spray nozzle which applied dye at a level of 0.0125% by weight.

After the application of the dye, a solution containing water, Drom® fragrance oil (Chevrefeuille) and nonionic surfactant, was sprayed onto the cellulosic particles at a rate of 40 milliliters per pound of cellulosic particles to achieve levels in the granules of 0.1% fragrance oil, and 0.1% surfactant.

An aqueous solution of Spinks 211 was then sprayed onto the surface of the wetted cellulosic particles at an active level of about 2% by weight. Then, a dry guar gum powder having a mesh size of about 200 was dusted onto the tacky surfaces of the cellulosic particles at a level of about 3% by weight. Due to the amount of moisture added, the cellulosic particles were dried using a fluid bed drier to a moisture level of less than about 5% and then bagged and stored for future use as a cat litter.

Example 2

Clumping Comparisons

The rate of hardening and relative clump strength of clumping cellulosic litter in accordance with the present invention were compared to commercial clay and cellulosic-based clumping litters. In performing these tests, the following equipment was used:

0–10 pound force gauge with stand 10 ml self zeroing buret litter pan timer/stopwatch The procedure was as follows:

1. Fill buret with 10 ml of water.
2. Fill litter pan with 2 inches of the litter to be tested.
3. Center litter pan 3 inches from tip of buret.
4. Open stop cock on buret and allow water to drain onto litter.
5. Start timer and allow wetted litter to stand 60 seconds.
6. Remove clump and place on force gauge stand.
7. Zero out the force gauge, make sure power is on.
8. In an even, slow motion, raise the force stand so that the clump engages the foot until the clump breaks.
9. Display break strength at the point at which clump broke.

The force gauge comprises a ⅜ inch stationary foot centered above a stand having supporting sides spaced ½ inch apart. The foot is attached to the force gauge. The stand is movable upwardly to engage the stationary foot.

The results of these tests are summarized in bar graph form in FIG. 1. As shown there, at every time interval tested (from 15 minutes to 24 hours), the clumping cellulosic litter in accordance with the present invention produced strikingly harder clumps. This superior hardness translated into a much more efficient and convenient clumping litter.

Example 3

Use as Cat Litter

The product of Example 1 was placed in a conventional cat litter box. Use of the box was monitored, so that immediately after the litter was wetted by a urinating cat, the litter was examined. Certain criteria were established for evaluating this material. These included a requirement that a coherent clump be formed within 30 seconds after the application of urine and that the resulting clump be sufficiently coherent that it could be easily segregated and removed from the remaining absorbent without leaving any residual wetted material.

It was found that the urine was absorbed in well-defined litter clumps. These clumps were removed after no more than 5 minutes following wetting. It was found that they could be easily removed using a small scoop of the type typically used with clumping clay-based absorbents. The clumps removed after 30 seconds were found to be well-formed, coherent, and non-friable so that no wetted-absorbent remained in the litter box. This was identified as a particularly desirable advantage over clay litters since these hard clumps were hard enough to effectively resist break up due to movement of the cat in the litter box. The clumps adhered to fecal matter as well as clay-based litters. The litter box, cleared of urine-filled clumps, was permitted to stand for two weeks during which it was monitored and found to be odor-free.

While the present invention is described above in connection with preferred or illustrative embodiments, these embodiments are not intended to be exhaustive or limiting of the invention. Rather, the invention is intended to cover all alternatives, modifications and equivalents which may be included within its spirit and scope, as defined by the appended claims.

What we claim is:

1. A clumping cellulosic animal litter comprising:
   a plurality of cellulosic particles having an outer coating of guar gum, and an inner coating of a dual adhesive and surface agent at a solids level sufficient to bind the guar coating, in which the dual adhesive and surface active agent is a polyacrylate with an average molecular weight of about 1000 to 5000.

2. The cellulosic animal litter of claim 1 in which the cellulosic particles contain at least 40% of cellulosic content.

3. The cellulosic animal litter of claim 1 in which the cellulosic particles contain at least 50% of cellulosic content.

4. The cellulosic animal litter of claim 1 in which the cellulosic particles are derived from primary paper sludge or a combination of primary and secondary paper sludge.

5. The cellulosic animal litter of claim 1 in which the cellulosic particles are in granular form.

6. The cellulosic animal litter of claim 5 in which the cellulosic particles are from about 4 to 60 mesh in size.

7. The cellulosic animal litter of claim 5 in which the cellulosic particles are from about 12 to 20 mesh in size.

8. The cellulosic animal litter of claim 1 in which the cellulosic particles are in pellet form.

9. The cellulosic animal litter of claim 1 in which the dual adhesive and surface active agent is 1) water soluble, 2) capable of penetrating and drying into the particulate cellulosic absorbents, 3) capable of adhering to guar, and 4) capable of being readily re-solubilized when the granule is wetted with urine.

10. The cellulosic animal litter of claim 1 comprising a mixture of coated and uncoated cellulosic particles.

11. The cellulosic animal litter of claim 1 comprising dual adhesive and surface active agent chosen from the group consisting of polyacrylates and acrylate copolymers.

12. The cellulosic animal litter of claim 1 in which the dual adhesive and surface active agent is a polyacrylate with an average molecular weight of about 2000 to 4000.

13. The cellulosic animal litter of claim 1 in which the dual adhesive and surface active agent is a polyacrylate with an average molecular weight of about 2000 to 3000.

14. The cellulosic animal litter of claim 1 in which the amount of dual adhesive and surface active agent used will be at least an amount sufficient to coat 50% of the surface of the granules and no more than the amount capable of being absorbed by the granule.

15. The cellulosic animal litter of claim 1 in which the dual adhesive and surface active agent will be present in an amount that primarily coats and only minimally penetrates into the granules.

16. The cellulosic animal litter of claim 1 in which the level of guar used in coating the granules will be at least about 1% to 7% based on the weight of the granules previously coated with the dual adhesive and surface active agent.

17. The cellulosic animal litter of claim 1 in which the level of guar used in coating the granules will be at least about 2% to 4% based on the weight of the granules previously coated with the dual adhesive and surface active agent.

18. The cellulosic animal litter of claim 1 comprising a mixture of coated and uncoated cellulosic particles in which from about 50% to 75% by weight of the granules are coated.

19. The cellulosic animal litter of claim 1 including anti-microbial agents, fragrances and coloring agents.

20. A clumping cellulosic animal litter comprising:
   a plurality of cellulosic particles having an outer coating of guar gum, and an inner coating of a dual adhesive and surface active agent at a solids level sufficient to bind the guar coating in which the dual adhesive and surface active agent is an aqueous sodium polyacrylate solution with a solids content of 43.0–45.0, a pH of 7.00–8.00, and a viscosity of 100–500 cps.

21. A clumping cellulosic animal litter comprising:
   a plurality of cellulosic particles having an outer coating of guar gum, and an inner coating of a dual adhesive and surface active agent, the inner coating being present at a level of from about 1% to 5% by weight, based on the weight of the granules, of a 43%–45% by weight solids solutions.

\* \* \* \* \*